United States Patent
Ryu et al.

(10) Patent No.: US 9,477,416 B2
(45) Date of Patent: Oct. 25, 2016

(54) DEVICE AND METHOD OF CONTROLLING DISK CACHE BY IDENTIFYING CACHED DATA USING METADATA

(71) Applicant: SAMSUNG ELECTRONICS CO., LTD., Suwon-si, Gyeonggi-do (KR)

(72) Inventors: Jun-hee Ryu, Seoul (KR); Jong-ryool Kim, Suwon-si (KR); Hyun-ku Jeong, Daejeon (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 17 days.

(21) Appl. No.: 14/592,995

(22) Filed: Jan. 9, 2015

(65) Prior Publication Data

US 2015/0199142 A1    Jul. 16, 2015

(30) Foreign Application Priority Data

Jan. 10, 2014  (KR) .................. 10-2014-0003606

(51) Int. Cl.
*G06F 13/00*   (2006.01)
*G06F 3/06*    (2006.01)
*G06F 12/08*   (2016.01)

(52) U.S. Cl.
CPC ............ *G06F 3/0619* (2013.01); *G06F 3/065* (2013.01); *G06F 3/068* (2013.01); *G06F 3/0611* (2013.01); *G06F 3/0656* (2013.01); *G06F 3/0679* (2013.01); *G06F 12/0866* (2013.01); *G06F 12/0895* (2013.01); *G06F 2212/225* (2013.01)

(58) Field of Classification Search
CPC .... G06F 3/0619; G06F 3/0611; G06F 3/068; G06F 3/0656; G06F 12/08; G06F 3/065; G06F 3/0679; G06F 12/0871; G06F 12/0866
USPC ........................................ 711/113, 103, 122
See application file for complete search history.

(56) References Cited

U.S. PATENT DOCUMENTS

| | | | | |
|---|---|---|---|---|
| 7,716,411 | B2* | 5/2010 | Panabaker | G06F 12/06 710/100 |
| 2012/0144109 | A1* | 6/2012 | Balakrishnan | G06F 12/0871 711/113 |
| 2013/0173853 | A1* | 7/2013 | Ungureanu | G06F 12/124 711/103 |
| 2014/0013027 | A1* | 1/2014 | Jannyavula Venkata | G06F 12/0866 711/103 |

* cited by examiner

*Primary Examiner* — Hong Kim
(74) *Attorney, Agent, or Firm* — Staas & Halsey LLP (57) ABSTRACT

Provided are a device and method of controlling a dish cache, wherein a time of seeking a disk cache may be shortened and a hit rate of a disk cache may be increased. The device includes a main memory including a buffer cache, a flash memory including a flash cache, and a controller controlling the buffer cache and the flash cache, wherein the buffer cache and the flash cache are enabled to cache a data block stored in a disk, and the controller identifies a position where the data block is cached using metadata.

18 Claims, 4 Drawing Sheets

DEVICE AND METHOD OF CONTROLLING DISK CACHE BY IDENTIFYING CACHED DATA USING METADATA

CROSS-REFERENCE TO RELATED APPLICATION(S)

This application claims the benefit of Korean Patent Application No. 10-2014-0003606, filed on Jan. 10, 2014, in the Korean Intellectual Property Office, the disclosure of which is incorporated herein in its entirety by reference.

BACKGROUND

1. Field

One or more exemplary embodiments relate to a device and method of controlling a disk cache, wherein time of seeking a disk cache may be shortened and a hit rate of a disk cache may be increased.

2. Description of the Related Art

In general, hard disks have a large capacity but they have a low access speed. Thus, as access to a hard disk increases, an input/output (I/O) time may increase and a speed of processing data may decrease. Accordingly, disk cache technology is widely used to reduce access to a hard disk.

Recently, data that is read out from a hard disk may be stored in a buffer cache of a main memory. Thus, when a central processing unit refers to the data afterwards, the data may be read out from the buffer cache without accessing the hard disk. Accordingly, when the disk cache technology is used, access to a hard disk may be reduced, and therefore the speed of processing data may increase.

As technologies related to storage devices are developed, storage devices including flash memories are being widely distributed recently. For example, solid state disks (SSDs) include high-speed semiconductor memories such as Not AND (NAND) flash memories or dynamic random access memories (DRAMs). Unlike hard disks, SSDs enable random access, and therefore data may be accessed within a short seeking time.

Accordingly, storage devices including flash memories may have a higher access speed than hard disks. Although storage devices including flash memories have a lower data access speed than main memories, in general, storage devices including flash memories may have a larger capacity than main memories.

Storage devices including flash memories may be used as disk caches. In other words, data that is read out from a hard disk may be stored in a flash cache of a storage device including a flash memory.

SUMMARY

One or more exemplary embodiments include a device and method of controlling a disk cache, wherein time of seeking a disk cache may be shortened.

One or more exemplary embodiments include a device and method of controlling a disk cache, wherein a hit rate of a disk cache may be increased.

One or more exemplary embodiments include a device and method of controlling a disk cache, wherein space that metadata used to seek a disk cache occupies may be reduced.

Additional aspects will be set forth in part in the description which follows and, in part, will be apparent from the description, or may be learned by practice of the presented exemplary embodiments.

According to one or more exemplary embodiments, a device for controlling a disk cache includes a main memory including a buffer cache, a flash memory including a flash cache, and a controller for controlling the buffer cache and the flash cache, wherein the buffer cache and the flash cache are enabled to cache a data block stored in a disk, and the controller identifies a position where the data block is cached by using metadata.

By using the metadata, the controller may identify cached data block as being cached in the buffer cache or in the flash cache.

The metadata may include an identifier of a cache from among the buffer cache or the flash cache in which the cached data block is cached.

The metadata may further include information regarding a position where the cached data block is cached within a cache.

At least some of cached data blocks may be simultaneously cached in the buffer cache and the flash cache, and the metadata may include a list of identifiers of caches in which the cached data blocks are cached and information regarding a position where the cached data blocks are cached within the caches.

The cached data block may be exclusively cached in the buffer cache or the flash cache.

The metadata may include a list of a file identifier of a file to which the cached data blocks belong and block information regarding the cached data blocks.

In a file identifier, a list of block information corresponding to data blocks cached in the buffer cache or in the flash cache from among the data blocks included in a file corresponding to the file identifier may be mapped.

The block information may include information regarding an offset information of the cached data blocks within the file to which the cached data blocks belong, an identifier of a cache in which the cached data blocks are cached, and a position where the cached data blocks are cached within the cache.

By using a file identifier of a file to which a targeted data block from among the data blocks belongs and an offset information of the targeted data block within the file, the controller may determine if the targeted data block is cached in the buffer cache or the flash cache.

By using the file identifier and the offset, the controller may obtain information regarding an identifier of a cache in which the targeted data block is cached and a position where the targeted data block is cached within the cache from the metadata.

According to one or more exemplary embodiments, a method of controlling a disk cache includes determining whether a targeted data block is cached in at least one of a buffer cache and a flash cache using metadata, moving, when determining that the targeted data block is not cached, at least one data block determined as being cached in the buffer cache to the flash cache or discarding at least one data block determined as being cached in the buffer cache, and reading the targeted data block from a disk and caching the targeted data block in the buffer cache, wherein the metadata includes information regarding an identifier corresponding with a cache of the data block cached in the buffer cache or a cache of the data block cached in the flash cache and a position where the cached data block is cached within the cache.

The moving of at least one data block cached in the buffer cache to the flash cache or discarding of at least one data block cached in the buffer cache may include selecting the at least one data block from among data blocks cached in the buffer cache and when determining the selected data block is cached by a read-ahead function, discarding the selected data block, and when determining the selected data block is not cached by a read-ahead function, moving the selected data block to the flash cache.

The selecting of the at least one data block from among data blocks cached in the buffer cache may include selecting a data block that has been least recently referred to from among the data blocks cached in the buffer cache.

The selecting of the at least one data block from among data blocks cached in the buffer cache may include selecting a data block that has been least frequently referred to from among the data blocks cached in the buffer cache.

According to one or more exemplary embodiments, a method of controlling a disk cache includes determining whether a targeted data block is cached in at least one of a buffer cache and a flash cache using metadata, and when determining the targeted data block is as cached, identifying whether the targeted data block is cached in the buffer cache or is cached in the flash cache using the metadata, when determining the targeted data block is cached in the flash cache, moving at least one data block cached in the buffer cache to the flash cache or discarding at least one data block cached in the buffer cache; and moving or copying the targeted data block from the flash cache to the buffer cache, wherein the metadata includes information regarding an identifier corresponding with a cache of the data blocks cached in the buffer cache or a cache of data blocks cached in the flash cache and a position where the cached data blocks are cached within the cache.

At least some of the cached data blocks may be simultaneously cached in the buffer cache and the flash cache, the metadata may include a list of identifiers of the caches in which the cached data blocks are cached and information regarding a position where the cached data blocks are cached within each of the caches, and the moving or copying of the targeted data block from the flash cache to the buffer cache may include copying the targeted data block from the flash cache to the buffer cache.

The cached data blocks may be exclusively cached in the buffer cache or the flash cache, and the moving or copying of the targeted data block from the flash cache to the buffer cache may include moving the targeted data block from the flash cache to the buffer cache.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

The effect and feature of the inventive concept and methods of accomplishing the same will become apparent from the following description of exemplary embodiments in detail, taken in conjunction with the accompanying drawings. The inventive concept may, however, be embodied in many different forms and should not be construed as limited to the exemplary embodiments set forth herein. Rather, these embodiments are provided so that this disclosure will be thorough and complete and will fully convey the scope of the inventive concept to one of ordinary skill in the art, and the scope of the inventive concept is defined by the appended claims. Throughout the specification, like reference numerals denote like elements.

Although the terms "first," "second," etc. may be used herein to describe various components, these components should not be limited by these terms. These terms are only used to distinguish one component from another. Thus, a first component discussed below could be termed a second component without departing from the teachings of the exemplary embodiments.

The terms used herein are merely used to describe the exemplary embodiments, and are not intended to limit the inventive concept. An expression used in the singular encompasses the expression of the plural, unless the context clearly indicates otherwise. It will be further understood that the terms "comprises" and/or "comprising" used herein specify the presence of stated components or steps, but do not preclude the presence or addition of one or more other components or steps.

All terms used herein have meanings which can be generally understood by those of ordinary skill in the art, if the terms are not particularly defined. General terms defined by dictionaries should be understood to have meanings which can be contextually understood in the art and should not have ideally or excessively formal meanings, if the terms are not defined particularly herein by the inventive concept.

Hereinafter, a device 100 for controlling a disk cache and method of controlling a disk cache, according to exemplary embodiments, will be described in detail with reference to FIGS. 1 to 4.

Figure 1:
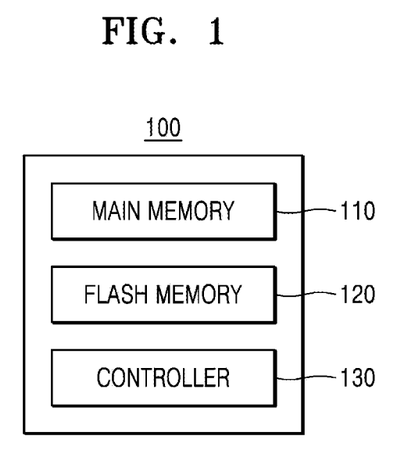
FIG. 1 is a block diagram that illustrates a structure of a device controlling a disk cache, according to an embodiment.

FIG. 1 is a block diagram that illustrates a structure of a device 100 for controlling a disk cache, according to an embodiment. Referring to FIG. 1, the device 100 for controlling a disk cache, according to the present embodiment, may include a main memory 110 including a buffer cache, a flash memory 120 including a flash cache, and a controller 130 controlling the buffer cache and the flash cache.

The main memory 110 may be a volatile memory. The main memory 110, for example, may be random access memory (RAM). The main memory 110 may include the buffer cache allocated for a disk cache. Data that is read out from a hard disk may be stored in the buffer cache. Thus, when the data is referred to afterwards, the data may be read out from the buffer cache without requiring access to the hard disk.

The main memory 110 may store metadata. The metadata may be used to seek information of a disk cache. A data structure of the metadata will be described later with reference to FIG. 2.

The flash memory 120 may be a non-volatile memory. The flash memory 120, for example, may be a solid state disk (SSD). The flash memory 120 may include a high-speed semiconductor memory such as a Not AND (NAND) flash memory or dynamic random access memory (DRAM). The flash memory 120 may support random access to data stored in the flash memory 120.

Accordingly, a speed of accessing data stored in the flash memory 120 may be higher than a speed of accessing data stored in the hard disk. The speed of accessing data stored in the flash memory 120 may be lower than a speed of accessing data stored in the main memory 110. A capacity of the flash memory 120 may be larger than a capacity of the main memory 110.

The flash memory 120 may include the flash cache allocated for a disk cache. Data that is read out from the hard disk may be stored in the flash cache. Thus, when the data is referred to afterwards, the data may be read out from the flash cache without requiring access to the hard disk.

The controller 130 may control the buffer cache and the flash cache. The controller 130 may control the buffer cache and the flash cache by using the metadata stored in the main memory 110. The controller 130 may seek a data block cached in the buffer cache and the flash cache by using the metadata.

The hard disk may store at least one file. Each file may include at least one data block. A position of a data block within a file may be represented by using an offset from a starting point of the file. Therefore, the data block may be specified by using an identifier (ID) of the file to which the data block belongs and offset information regarding the data block within the file.

The data block may denote a unit that is read out from the hard disk. The data block may also denote a unit that is cached in the buffer cache or the flash cache. Accordingly, at least a portion of files stored in the hard disk may be cached in the buffer cache or the flash cache. Also, at least a portion of data blocks included in the file may be cached in the buffer cache or the flash cache.

Figure 2:
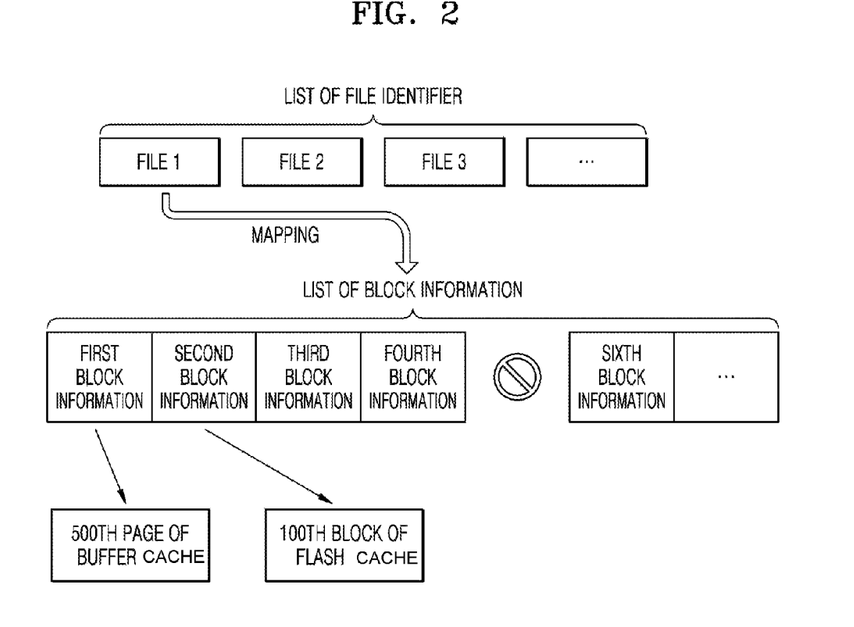
FIG. 2 is a reference diagram for describing a data structure of metadata included in a device controlling a disk cache, according to an embodiment.

FIG. 2 is a reference diagram for describing a data structure of metadata stored in the main memory 110, according to an embodiment. Referring to FIG. 2, the metadata may include a list of an identifier of a file to which each cached data block belongs. In addition, the metadata may further include information regarding each cached data block (hereinafter, referred to as block information).

A list of block information respectively corresponding to cached data blocks from among a plurality of data blocks included in one file may be mapped in the identifier of the file. In other words, in a file identifier included in the metadata, a list of block information respectively corresponding to data blocks that are cached in a buffer cache or a flash cache from among data blocks included in a file corresponding to the file identifier may be mapped.

Also, the block information may include information regarding an offset of a cached data block within a file to which the cached data block belongs, an identifier of a cache in which the cached data block is stored, and a position where the cached data block is stored within the cache where the cached data block is stored.

A data block may be cached in a buffer cache or in a flash cache. Accordingly, by using the identifier of the cache included in the block information, whether the cache, in which the cached data block is stored, is a buffer cache or a flash cache may be specified. Also, by using the information regarding a position where the cached data block is stored, a position where the cached data block is stored within the buffer cache or the flash cache may be specified.

The data block may be simultaneously stored in at least one cache. The data block may be exclusively cached in a buffer cache or a flash cache. In other words, the data block may be cached only in one cache. If the data block is cached only in one cache, it may be understood that the data block is cached by exclusive caching.

Also, the data block may be simultaneously cached in the buffer cache and the flash cache. In other words, the data block may be simultaneously cached in a plurality of caches.

If the data block is simultaneously cached in the caches, it may be understood that the data block is cached by inclusive caching.

When the data block is simultaneously cached in the caches, the block information may include a list of an identifier of a cache in which the cached data block is stored, and a list of information regarding a position where the cached data block is stored within each of the caches where the cached data block is stored.

The controller 130 may seek a data block cached in a buffer cache and a flash cache by using metadata. By using an identifier of a file to which a targeted data block, which is to be referred to, belongs, the controller 130 may detect if a file identifier that is identical with the file identifier is included in the metadata.

It may be assumed as an example that the controller 130 has the identifier of a file to which the targeted data block belongs as "File 1." By checking a file identifier included in the metadata, the controller 130 may detect if a file identifier identical with "File 1" is included in the metadata. Unless the file identifier identical with "File 1" is present in the metadata, the controller 130 may determine that the targeted data block is neither cached in the buffer cache nor cached in the flash cache.

A case in which a file identifier that is identical with the identifier of a file to which the targeted data block belongs is present in the metadata may also be assumed. By using information regarding an offset of the targeted data block within a file to which the targeted data block belongs, the controller 130 may detect if block information regarding a cached data block corresponding to the targeted data block is included in the metadata.

Referring to FIG. 2, the controller 130 may detect if block information corresponding to the targeted data block is included in the metadata by checking a list of block information mapped in the file identifier "File 1." Referring to FIG. 2, an order in which respective block information is stored in the list of block information may be sorted by an offset of a data block corresponding to block information.

For example, a first data block of a file corresponding to "File 1" will be referred to as a first block, and the following blocks of the first block will be sequentially referred to as a second block, a third block, etc. In other words, the data block corresponding to block information will be referred to as the first block, the second block, the third block, etc. according to an order in which the offset of the data block ascends.

As shown in FIG. 2, first block information corresponding to the first block, second block information corresponding to the second block, third block information corresponding to the third block, and fourth block information corresponding to a fourth block may be included in the metadata. In other words, the first to fourth blocks may be cached in a buffer cache or in a flash cache.

Also, fifth block information corresponding to a fifth block may not be included in the metadata. In other words, the fifth block may not be cached in the buffer cache and the flash cache.

Accordingly, if block information corresponding to the targeted data block, which is to be referred to, is included in the metadata, the controller 130 may determine that the targeted data block is cached in the buffer cache or the flash cache. Unless the block information corresponding to the targeted data block is included in the metadata, the controller 130 may determine that the targeted data block is neither cached in the buffer cache nor cached in the flash cache.

It may be assumed as an example that the targeted data block is a second data block of the file corresponding to "File 1." The controller 130 may obtain the second block information corresponding to the second block by checking the list of block information mapped in the file identifier "File 1." The controller 130 may recognize that the second block is cached in the flash cache by using an identifier of a cache included in the second block information. Also, the controller 130 may recognize that the second block is stored in a one hundredth block within the flash cache by referring to the second block information.

As shown in FIG. 2, each data block may be cached only in one cache, which is one of the buffer cache and the flash cache. That is, the data block may be cached by exclusive caching.

Figure 3:
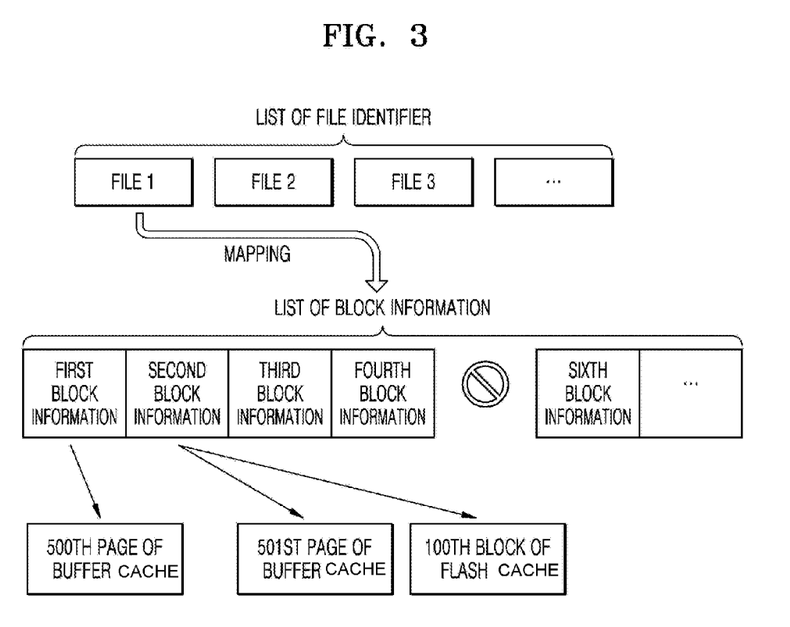
FIG. 3 is a reference diagram for describing a data structure of metadata included in a device controlling a disk cache, according to another embodiment.

FIG. 3 is a reference diagram for describing a data structure of metadata included in a device for controlling a disk cache, according to another embodiment. Referring to FIG. 3, the controller 130 may obtain second block information corresponding to a second block by checking a list of block information mapped in a file identifier "File 1." The controller 130 may recognize that the second block is simultaneously cached in a buffer cache and a flash cache by using a list of an identifier of a cache included in the second block information. Also, the controller 130 may recognize that the second block is stored in a five hundredth page within the buffer cache and in a one hundredth block with the flash cache by referring to the second block information.

As shown in FIG. 3, each data block may be simultaneously cached in a plurality of caches. That is, a data block may be cached by inclusive caching.

When the data block is cached by exclusive caching, space that the metadata occupies may be reduced compared to when the data block is cached by inclusive caching. Also, in the case that the data block is cached by inclusive caching, the same data block may be repeatedly cached in a plurality of caches. Accordingly, in the case that the data block is cached by exclusive caching, the number of cached data blocks which are different from each other, compared to a cache capacity, may be greater than in the case that the data block is cached by inclusive caching. Thus, when the data block is cached by exclusive caching, a hit rate of a disk cache may be increased, compared to when the data block is cached by inclusive caching. Therefore, in the case that the data block is cached by exclusive caching, the number of times of access to a hard disk may be less than in the case that the data block is cached by inclusive caching.

According to an embodiment, if the total number of data blocks to be referred to is greater than the maximum number of data blocks that may be cached in the buffer cache and is equal to or less than the maximum number of data blocks that may be cached in the flash cache, the data block may be cached by inclusive caching. Also, if the total number of data blocks to be referred to is greater than the maximum number of data blocks that may be cached in the flash cache and is equal to or less than the maximum number of data blocks that may be exclusively cached in the buffer cache and the flash cache, the data block may be cached by exclusive caching.

As described above, whether a cache that a targeted data block is stored in is a buffer cache or a flash cache may be recognized by using block information included in the metadata. That is, a position where a data block is stored may be specified by using block information having the same data structure regardless of types of a cache in which the data block is stored. Accordingly, when a cache is sought by using block information according to exemplary embodiments, it may take less time to seek a disk cache than when the cache is sought by using data structures which are different according to types of a cache.

Figure 4:
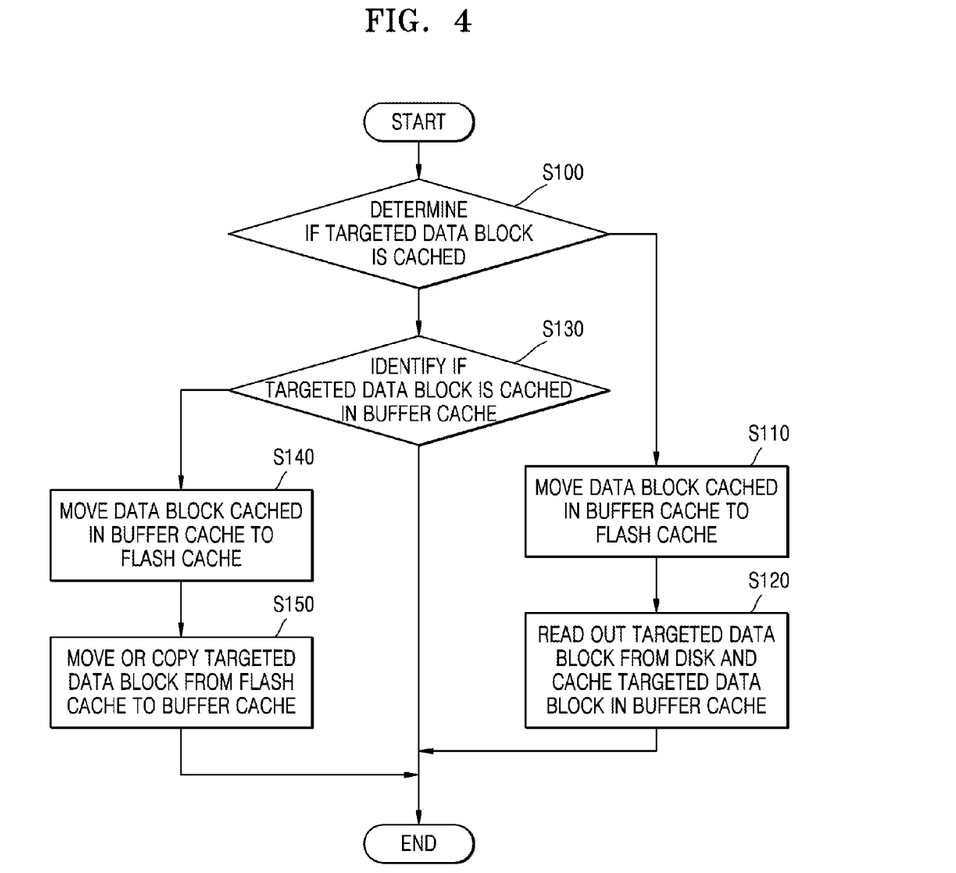
FIG. 4 is a flowchart that illustrates a process of performing a method of controlling a disk cache, according to an embodiment.

FIG. 4 is a flowchart that illustrates a process of performing a method of controlling a disk cache, according to an embodiment. Referring to FIG. 4, in operation S100, it may be determined if a targeted data block is cached by using metadata.

The metadata may include a list of an identifier of a file to which each cached data block belongs. Also, the metadata may further include block information regarding each cached data block. In a file identifier included in the metadata, a list of block information respectively corresponding to data blocks that are cached in a buffer cache or in a flash cache from among data blocks included in a file corresponding to the file identifier may be mapped.

The block information may include information regarding an offset of a cached data block within a file to which the cached data block belongs, an identifier of a cache in which the cached data block is stored, and a position where the cached data block is stored within the cache where the cached data block is stored. The identifier of a cache included in block information may be used to determine if the cached data block is stored in a buffer cache or in a flash cache.

By using an identifier of a file to which a targeted data block belongs, the controller 130 may detect if a file identifier that is identical with the file identifier is included in the metadata. The controller 130 may detect if block information corresponding to the targeted data block is included in the metadata by checking a list of block information mapped in a file identifier included in the metadata.

If it is determined that the targeted data block is not cached, in operation S110, at least one data block cached in a buffer cache of the main memory 110 may be moved to a flash cache. In the case that the targeted data block is determined as not cached, the controller 130 may check if there is any available block left in the buffer cache. If no available block is left, the controller 130 may move at least one data block having already been cached in the buffer cache to the flash cache. If an available block is left, the controller 130 may not move a data block cached in the buffer cache to the flash cache.

The controller 130 may identify (select) a data block to be moved to the flash cache from among data blocks cached in the buffer cache. For example, the controller 130 may move a data block that has been least recently referred to from among the data blocks cached in the buffer cache to the flash cache. That is, the controller 130 may select a data block according to a least recently used (LRU) algorithm.

According to another embodiment, the controller 130 may move a data block that has been least frequently referred to from among data blocks cached in the buffer cache to the flash cache. That is, the controller 130 may select a data block according to a least frequently used (LFU) algorithm.

A case in which an operating system refers to a file including real-time data such as videos or music will be assumed. The operating system may support a read-ahead function when the file including real-time data is referred to. Accordingly, a data block that is expected to be referred to in the future from among data blocks included in the file including real-time data may be cached ahead.

The data block cached ahead by the read-ahead function may be cached in the buffer cache of the main memory 110. If a data block including real-time data is cached in the flash cache, problems may occur in processing data in real-time due to a low access speed compared to the buffer cache.

Also, due to the read-ahead function, it may be guaranteed that a real-time data block currently referred to has been cached.

Accordingly, if the data block selected by the above method is a data block cached ahead by the read-ahead function, the controller 130 may discard the selected data block without moving the selected data block to the flash cache.

Also, the controller 130 may check if there is any available block left in the flash cache. If no available block is left, the controller 130 may discard at least one data block having already been cached in the flash cache. If an available block is left, the controller 130 may move at least one data block from the buffer cache to the flash cache.

The controller 130 may select a data block to be discarded from among data blocks cached in the flash cache. For example, the controller 130 may select a data block according to the LRU algorithm or the LFU algorithm. A method of selecting the data block to be discarded from among the data blocks cached in the flash cache may be the same or different from a method of selecting the data block to be moved to the flash cache from among the data blocks cached in the buffer cache.

In operation S120, the targeted data block may be read out from a hard disk and cached in the buffer cache. The controller 130 may store the data block read out from the hard disk in an available block generated by moving or discarding the selected data block.

If it is determined in operation S100 that the targeted data block is cached, in operation S130, a position where the targeted data block is cached by using the metadata may be identified. The controller 130 may use block information corresponding to the targeted data block from among block information included in the metadata to identify the position where the targeted data block is cached. The controller 130 may identify if the targeted data block is cached in the buffer cache or in the flash cache.

If the targeted data block is cached in the flash cache, in operation S140, at least one data block cached in the buffer cache may be moved to the flash cache. In the case that the targeted data block is cached in the flash cache, the controller 130 may check if there is any available block left in the buffer cache. If no available block is left, the controller 130 may move at least one data block having already been cached in the buffer cache to the flash cache. If an available block is left, the controller 130 may not move a data block cached in the buffer cache to the flash cache.

The controller 130 may select a data block to be moved to the flash cache from among data blocks cached in the buffer cache. For example, the controller 130 may select a data block according to the LRU algorithm or the LFU algorithm. If the selected data block is a data block cached ahead by the read-ahead function, the controller 130 may discard the selected data block without moving the selected data block to the flash cache.

Also, the controller 130 may check if there is any available block left in the flash cache. If no available block is left, the controller 130 may discard at least one data block having already been cached in the flash cache. If an available block is left, the controller 130 may move at least one data block from the buffer cache to the flash cache.

The controller 130 may select a data block to be discarded from among data blocks cached in the flash cache. For example, the controller 130 may select a data block according to the LRU algorithm or the LFU algorithm. A method of selecting the data block to be discarded from among the data blocks cached in the flash cache may be the same or different from a method of selecting the data block to be moved to the flash cache from among the data blocks cached in the buffer cache.

In operation S150, the targeted data block from the flash cache to the buffer cache may be moved or copied. The controller 130 may move or copy the targeted data block from the flash cache to an available block of the buffer cache. In the case that a data block is cached by exclusive caching, the targeted data block may be moved from the flash cache to the buffer cache. Also, in the case that the data block is cached by inclusive caching, the targeted data block may be copied from the flash cache to the buffer cache. After the targeted data block is moved or copied, the metadata may be renewed.

It may be guaranteed by the above method that a targeted data block to be referred to has been cached in the buffer cache of the main memory 110. The targeted data block may be copied from the buffer cache to a memory area of a program which is to refer to the targeted data block.

As described above, according to one or more of the above exemplary embodiments, the time of seeking a disk cache may be shortened, a hit rate of a disk cache may be increased, and space that metadata used to seek a disk cache occupies may be reduced.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. A device of controlling a disk cache, comprising:
a main memory including a buffer cache;
a flash memory including a flash cache; and
a controller controlling the buffer cache and the flash cache,
wherein the buffer cache and the flash cache are enabled to cache a data block stored in a disk, and the controller, using metadata, determines whether a targeted data block is cached in the buffer cache or the flash cache using a file identifier of a file to which the targeted data block belongs and an offset information of the targeted data block within the file and identifies a position where the data block is cached,
the metadata comprises a list of a file identifier of a file to which cached data blocks belong and block information regarding the cached data blocks.

2. The device of claim 1, wherein the controller, by using the metadata, identifies the data block as being cached in the buffer cache or in the flash cache.

3. The device of claim 1, wherein the metadata comprises an identifier of a cache with respect to the buffer cache or the flash cache in which the data block is cached.

4. The device of claim 3, wherein the metadata further comprises information regarding a position where the data block is cached within the cache.

5. The device of claim 4, wherein at least some of data blocks are simultaneously cached in the buffer cache and the flash cache, and the metadata comprises a list of identifiers of caches in which the cached data blocks are cached and information regarding a position where the cached data blocks are cached within the caches.

6. The device of claim 4, wherein the data block is exclusively cached in the buffer cache or the flash cache.

7. The device of claim 1, wherein the position of the data block is searchable using an identifier mapped to the data block in a list of identifiers stored in the main memory.

8. The device of claim 1, wherein, in the file identifier, a list of block information corresponding to data blocks cached in the buffer cache or in the flash cache among data blocks comprised in a file corresponding to the file identifier is mapped.

9. The device of claim 1, wherein the block information comprises information regarding an offset information of the cached data blocks within the file to which the cached data blocks belong, an identifier of a cache in which the cached data blocks are cached, and a position where the cached data blocks are cached within the cache.

10. The device of claim 1, wherein the controller obtains information regarding an identifier of a cache in which the targeted data block is cached and a position where the targeted data block is cached within the cache from the metadata using the file identifier and the offset information.

11. A method of controlling a disk cache, comprising:
  determining whether a target data block is cached in one of a buffer cache and a flash cache using a file identifier of a file to which the targeted data block belongs and an offset information of the targeted data block within the file and metadata; and
  controlling the target data block to be cached in one of the buffer cache and the flash cache in accordance with an access function associated with the data block when the determining indicates the target data block is to be cached,
  wherein cached data block is moved to create an available block for caching the target data block in the buffer cache, and
  wherein the metadata comprises a list of a file identifier of a file to which cached data blocks belong and block information regarding the cached data blocks, and the block information includes information regarding an identifier corresponding with a cache of the data blocks cached in the buffer cache or a cache of data blocks cached the flash cache and a position where the cached data blocks are cached within the cache.

12. A method of controlling a disk cache, the method comprising:
  determining whether a targeted data block is cached in at least one of a buffer cache and a flash cache using a file identifier of a file to which the targeted data block belongs and an offset information of the targeted data block within the file and metadata;
  moving, when the determining indicates the targeted data block is not cached, at least one data block determined as being cached in the buffer cache to the flash cache or discarding at least one data block determined as being cached in the buffer cache; and
  reading the targeted data block from a disk and caching the targeted data block in the buffer cache,
  wherein the metadata comprises a list of a file identifier of a file to which cached data blocks belong and block information regarding the cached data blocks and the block information includes information regarding an identifier corresponding with a cache of the data block cached in the buffer cache or a cache of the data block cached in the flash cache and a position where the cached data block is cached within the cache.

13. The method of claim 12, wherein the moving of the at least one data block or discarding of the at least one data block comprises:
  selecting the at least one data block from among data blocks cached in the buffer cache;
  discarding the selected data block when determining the selected data block is cached by a read-ahead function; and
  moving the selected data block to the flash cache when determining the selected data block is not cached by a read-ahead function.

14. The method of claim 13, wherein the selecting comprises selecting a data block that has been least recently referred to from among the data blocks cached in the buffer cache.

15. The method of claim 13, wherein the selecting comprises selecting a data block that has been least frequently referred to from among the data blocks cached in the buffer cache.

16. A method of controlling a disk cache, the method comprising:
  determining whether a targeted data block is cached in at least one of a buffer cache and a flash cache using a file identifier of a file to which the targeted data block belongs and an offset information of the targeted data block within the file and metadata;
  identifying whether the targeted data block is cached in the buffer cache or is cached in the flash cache using the metadata when the determining indicates the targeted data block is cached;
  moving at least one data block determined as being cached in the buffer cache to the flash cache or discarding at least one data block determined as being cached in the buffer cache, when the targeted data block is determined as being cached in the flash cache; and
  moving or copying the targeted data block from the flash cache to the buffer cache,
  wherein the metadata comprises a list of a file identifier of a file to which cached data blocks belong and block information regarding the cached data blocks and the block information includes information regarding an identifier corresponding with a cache of the data blocks cached in the buffer cache or a cache of data blocks cached the flash cache and a position where the cached data blocks are cached within the cache.

17. The method of claim 16, wherein at least some of the cached data blocks are simultaneously cached in the buffer cache and the flash cache and the metadata comprises a list of identifiers of the caches in which the cached data blocks are cached and information regarding a position where the cached data blocks are cached within each of the caches, and
  the moving or copying of the targeted data block from the flash cache to the buffer cache comprises copying the targeted data block from the flash cache to the buffer cache.

18. The method of claim 16, wherein the cached data blocks are exclusively cached in the buffer cache or the flash cache, and
  the moving or copying of the targeted data block from the flash cache to the buffer cache comprises moving the targeted data block from the flash cache to the buffer cache.

* * * * *